July 3, 1962

J. F. TOOMEY 3,041,937

ROCKET CONTROL SYSTEM

Filed Oct. 9, 1952

INVENTOR
JOHN F. TOOMEY

BY *J. D. O'Brien*
*R. M. Hicks*

ATTORNEYS

United States Patent Office

3,041,937
Patented July 3, 1962

3,041,937
ROCKET CONTROL SYSTEM
John F. Toomey, 250 Tulip Ave., Floral Park, N.Y.
Filed Oct. 9, 1952, Ser. No. 313,994
6 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

This invention relates to a rocket control apparatus adapted for use in an air-borne carrier such, for example, as a combat airplane and more particularly to a launching apparatus and fire control system for an ordnance missile.

Heretofore, rocket control systems which have been employed in service for similar purposes consisted of various mechanical and electrical components and delay devices, such, for example, as pyrotechnic delays, wind driven arming vanes, pressure responsive switches, thermal switches, inductive and magnetic arming devices and wind driven generators, flexible wires or cables. However, all the aforesaid devices whether used independently or in various combinations have certain disadvantages such, for example, as premature arming and firing of the rocket and thus for these reasons these devices fail to meet the safety requirements set forth by the armed forces. Furthermore such devices usually employed detachable pigtail connections to connect the rocket igniter to a source of electrical energy arranged within the aircraft, the connection being made as the rocket is placed in the launching rack or tube mounted beneath the wings of the aircraft before take off of the aircraft whereby the rocket igniter may be fired at will as the pilot actuates a suitable switch device arranged in the firing circuit. However, such arrangements have not proven entirely satisfactory for the reason that during take off or before the aircraft reaches a target the pigtail connections may become accidentally detached from the rocket thereby interrupting the circuit to the igniter and preventing ignition of the rocket propellant whereupon the rocket cannot be propelled from the launching rack under its own power.

Accordingly, the present invention is constructed and arranged to overcome the many disadvantages found in prior art devices and also provides means whereby a firing circuit is established to the rocket igniter without the use of the objectional pigtail connections.

An object of the invention resides in the provision of a new and improved launching and firing control apparatus for an ordnance missile.

Another object of the invention is the provision of a rocket launching apparatus in which means are provided for maintaining the rocket in a safe condition until the rocket is propelled from the launching rack.

Another object of the invention is the provision of a rocket launching apparatus having means for preventing premature arming and firing of the rocket and in which means are provided for preventing completion of the arming circuit in the event any of the component parts thereof are defective.

Still another object of the invention is the provision of a rocket launching and firing control system wherein means are provided for preventing arming of rocket fuze until the rocket has been set in motion and traveled a predetermined distance beyond the end of the launching rack.

Still another object is the provision of a new and improved arming circuit for a rocket wherein the arming time and delay time settings may be changed at will before the rocket is released toward a target.

Another object is the provision of new and improved means for disarming the rocket at the completion of the arming cycle thereof should the rocket fail to take off.

Still another object is the provision of means for preventing arming of the rocket should the rocket hit an object before the arming cycle is completed.

A further object of the invention is to provide a control system for a rocket fuze wherein means are provided for delaying the operation of the explosive arming device whereupon premature firing of the primer and main charge is prevented.

A still further object of the invention is to provide a control system for a rocket fuze wherein means are provided for partially arming the fuze as the rocket is propelled from the launching rack, and in which impact responsive means are employed to explode the rocket as the rocket strikes a target.

Other objects and many of the attendant advantages of this invention will be readily appreciated as the same becomes better understood by reference to the following detailed description when considered in connection with the accompanying drawings wherein.

Figure 1:
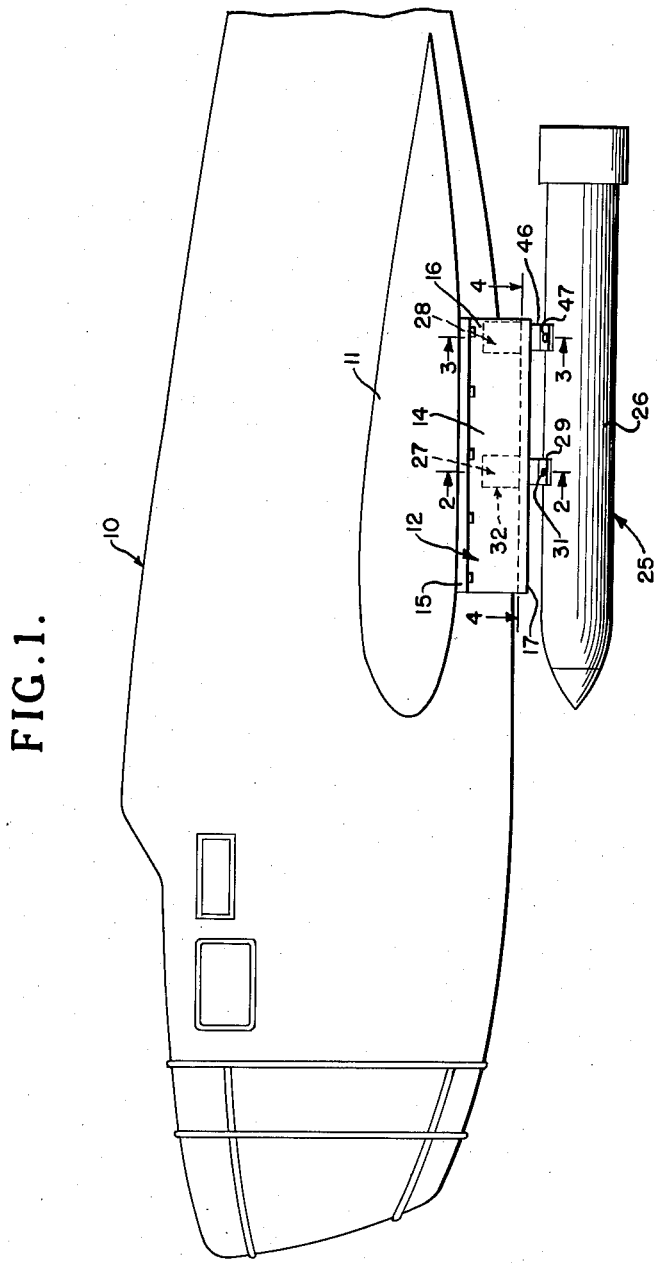
FIG. 1 is a view in side elevation of a fragmentary portion of an aircraft showing the launching apparatus of the present invention and the manner in which the rocket is supported beneath the wing of the aircraft.

Referring now to the drawings and more particularly to FIG. 1 thereof, the reference character 10 designates an aircraft having a pair of wings one of which is indicated by the numeral 11. A launching rack generally indicated by the reference numeral 12 is supported beneath and secured to each of the wings 11 in any suitable manner and comprises a pair of mutually spaced substantially Z-shaped members 13 and 14 having securing flanges 15 formed thereon whereby the members may be bolted or otherwise secured to the wings 11. Integrally formed with each flange 15 is a web portion 16 and a flange portion 17, the flange portions extending toward each other and terminating in spaced relation with respect to each other as indicated by the numeral 18.

Figure 4:
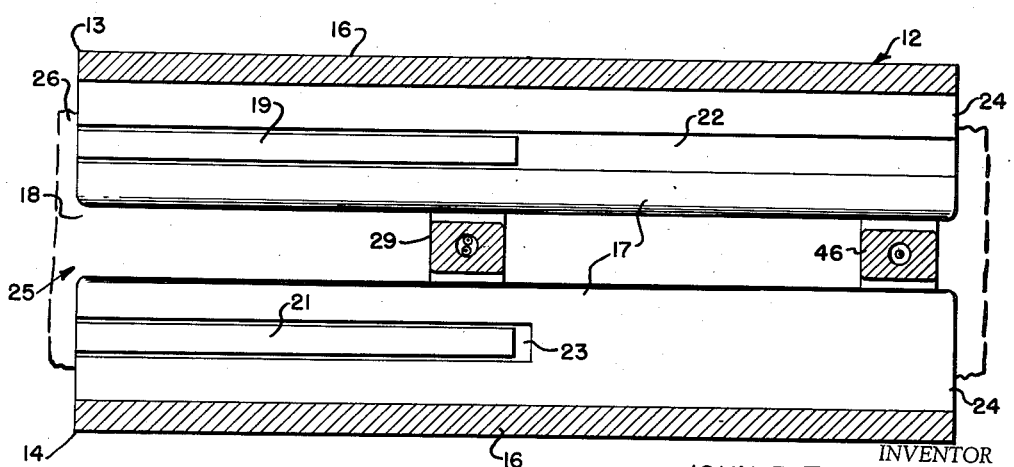
FIG. 4 is an enlarged sectional view taken on the line 4—4 of FIG. 1.

As more clearly shown on FIG. 4, the flange portions 17 have secured thereto a pair of contact rails 19 and 21 respectively, the rails being insulated therefrom by strips 22—23 composed of suitable insulating material. Strip 23 terminates short of the rear end portion 24 of the flange 17 upon which it is mounted and strip 22 extends the full length of the flange 17 upon which it is mounted, the rails 19 and 21 being embedded in their respective strips and terminating substantially midway between the end portions thereof.

As shown on FIG. 1 a rocket generally indicated by the numeral 25 comprises a casing 26, which contains a conventional rocket motor having the usual propellant and igniter means, the casing being releasably mounted on the rack 12 by means of front support 27 and a rear support 28. It will be understood, however, that any conventional locking device may be employed for maintaining the rocket locked to the rack and which will function to release the rocket when the rocket is set in motion by the rocket motor and the locking device is actuated to a release position.

The front support 27 comprises bracket 29 secured to the rocket casing 26 as at 31 and having a carriage 32 secured thereto as at 33. The carriage 32 is in the form of a substantially rectangular frame 34 having a pair of runners 35 formed thereon and extending downwardly therefrom into engagement with the flange 17 respectively. Secured to the frame 34 as at 36 and insulated therefrom by a pair of sleeves 37 is a pair of contact elements 38 and 39, element 38 comprising a contact 41 normally maintained in engagement with contact rail 19 by a spring 42, contact element 39 comprising a contact 43 normally maintained in engagement with rail 21 by a spring 44. A strip 45 composed of suitable insulating material is secured to the frame 34 and disposed superjacent the aforesaid contact elements 38 and 39 thereby to prevent shorting of the contact elements in response to a sudden shock received thereby during loading of the rocket into the rack or during airborne travel of the rocket.

Figure 2:
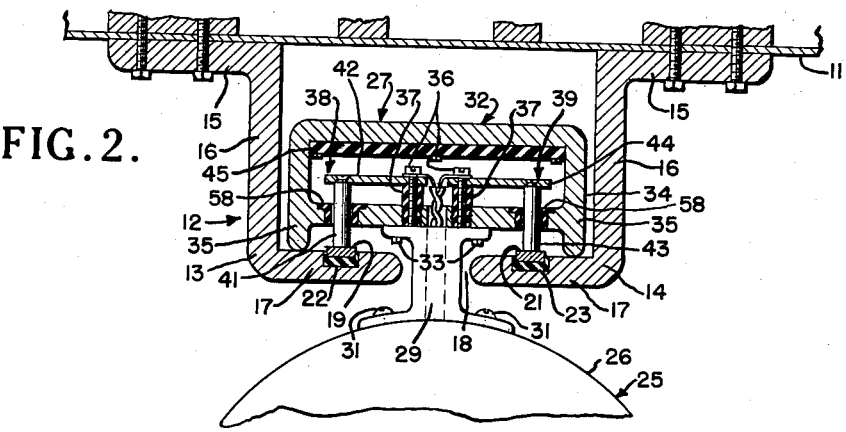
FIG. 2 is an enlarged sectional view taken on the line 2—2 of FIG. 1.
Figure 3:
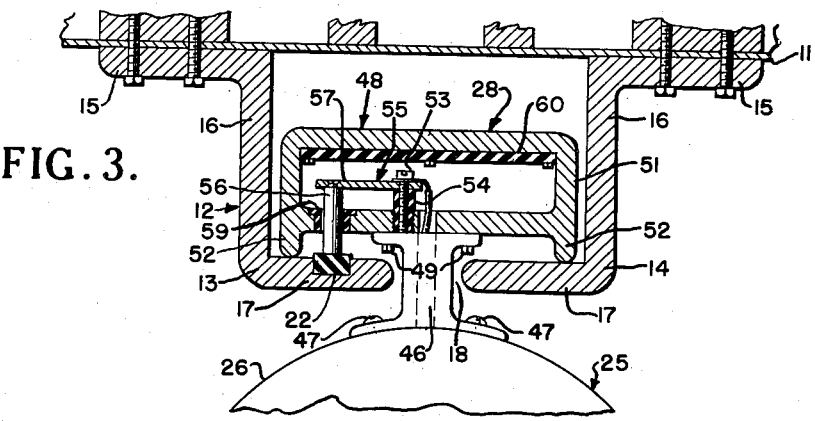
FIG. 3 is an enlarged sectional view taken on the line 3—3 of FIG. 1.

The rear support 28 is similar to the front support 27 and comprises a bracket 46 secured to the rocket casing 26 as at 47 and having a carriage 48 secured thereto as at 49; the carriage constituting a substantially rectangular frame 51 having a pair of runners 52 formed thereon and extending downwardly therefrom into engagement with the aforesaid flanges 17 respectively. Secured to the frame 51 as at 53 and insulated therefrom by a sleeve 54 is a contact element 55, the element comprising contact 56 normally maintained in engagement with the insulating strip 22 by a spring 57 and adapted to move into engagement with the contact rail 19 when the rocket is set in motion. As more clearly shown on FIG. 2 the contacts 41 and 43 are insulated from the frame 31 by bushings 58, and in like manner the contact 56 is insulated from the frame 51 by a bushing 59. The carriage 48 is also provided with an insulating strip 60 similar to the strip 45 arranged on carriage 32 which is adapted to prevent shorting the contact element 56.

Figure 5:
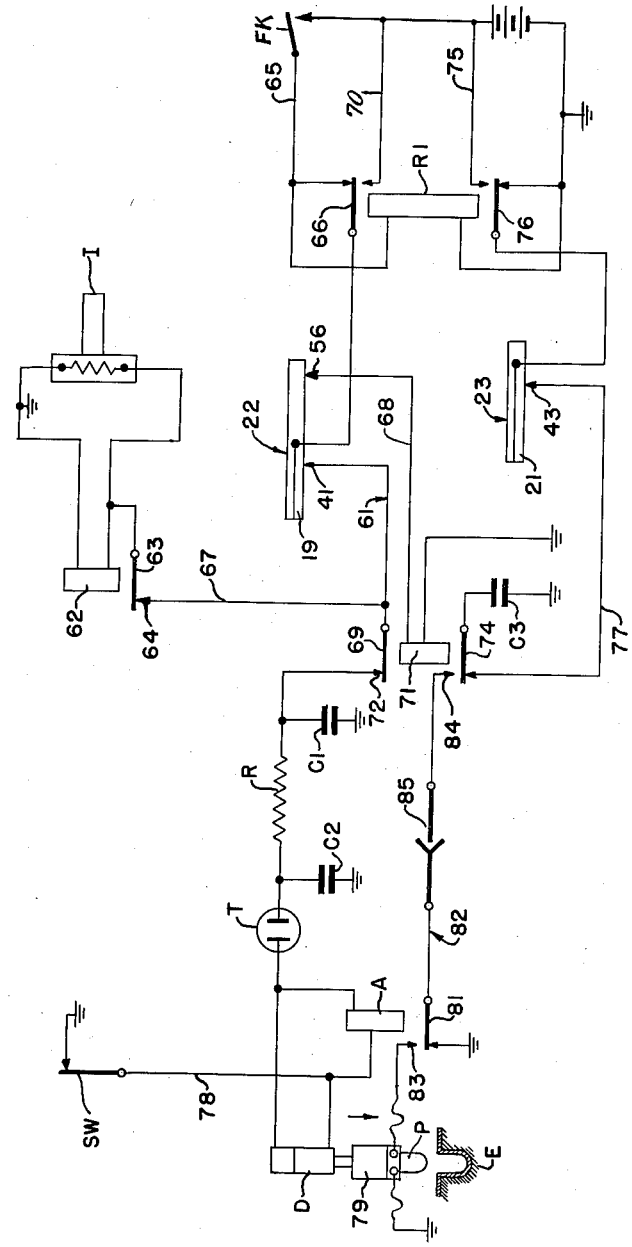
FIG. 5 is a circuit diagram of the control system as applied to a rocket in accordance with the present invention.

Referring now to the circuit arrangement of FIG. 5 R1 designates a charging switch or relay and I designates the rocket propellant igniter, the aforesaid igniter and charging switch being connected to a suitable source of electrical energy B arranged within the aircraft and controlled by switch devices respectively connected thereto.

The source of electrical energy has one of its terminals (usually designated as ground) bonded to the metal work on the plane on which the metal members 13 and 14 are mounted, and which support the carriage frames 32 and 48. Frames 32 and 48 are attached to the body of the rocket thereby completing the connection between the body of the rocket and the ground terminal of the plane's source of electrical energy. It will be understood, however, that the igniter I is adapted to be initiated in response to an electrical impulse received thereby prior to operation of the charging switch or relay R1 and thus the rocket propellant is fired and the rocket is propelled along the launching rack 12 toward the target. The firing circuit to the igniter is designated by the numeral 67 and includes conductor rail 19, contact 41, igniter switch 62, movable contact 63 thereof and contact member 64, the circuit being completed from the source of electrical energy by way of conductor 65 and movable contact 66 of switch R1 when the switch is in the position as shown, it being understood that a normally-open firing key FK is connected between conductor 65 and energy source B. It is also to be understood that, as the igniter is initiated in the aforesaid manner, switch 62 is actuated to an open position thereby interrupting the igniter firing circuit.

Switch R1 is controlled by means of the firing key in the fire control circuit. This switch has a delay feature which prevents its operation for about 10 milliseconds after the firing key is operated. This feature permits the immediate operation of the igniter without adding any apparatus for this purpose other than adding a back contact on switch R1.

The rocket is provided with a fuze which includes condensers C1 and C3 charged by charging circuits 61 and 77 respectively. The charging circuit 61 for condenser C1 includes conductor rail 19, contact 41, movable contact 69 of switch 71 and contact member 72, when switch R1 is in a closed or charging position and switch 62 is in an open position, the aforesaid charging circuit being completed from the source of energy by way of contact 66 and conductor 70. During the aforesaid charging cycle of C1 switch 62 remains open. The charging circuit 77 for condenser C3 includes conductor rail 21, contact 43, and movable contact 74 of switch 71, the circuit being completed from the source of energy by way of conductor 75 and movable contact 76 of switch device R1 when the switch is in the charging position. The aforesaid charging cycle will continue until contact 56 carried by the rear rocket support 28 moves into engagement with conductor rail 19. When this occurs the delay switch device 71 is actuated to an open position in response to an electrical impulse received thereby by way of rail 19, contact 56 and conductor 68. Switch 71 will operate after a short delay sufficient to permit the rocket to clear the plane and will thereafter remain operated.

When switch 71 operates it disconnects C1 and C3 from leads 61 and 77 and their associated contacts 41 and 43 which are located on the movable frames of the launcher. The purpose of this arrangement is to prevent the high voltage charges on C1 and C3 from leaking off, since these contacts are carried on the rocket and exposed to the weather.

As the rocket is propelled the set back switch SW in arming circuit 78 operates and opens the circuit to the arming switch A and detonator device D, the open condition of the circuit continuing until the acceleration of the rocket has decreased sufficiently to permit the set back switch to move to the initial closed position.

When the charging current is connected by switch R1 it charges C1 which is connected to C2 by resistor R. C1 discharges through R and C2 to ground thereby charging C2. When the voltage on C2 reaches a certain value tube T breaks down and C2 discharges through T thereby operating the arming switch A and the detonator device D, to ground at the contacts of SW which is now closed. It will be understood that switch A operates instantaneously and that device D is provided with a suitable delay means such, for example, as a pyrotechnic delay element, whereupon device D will operate at a slower rate than switch A. When device D operates, the primer shutter 79 connected thereto is moved a predetermined amount whereupon the primer P carried thereby is moved into firing relation with the main explosive or bursting charge E arranged within the rocket and thus the fuze is armed.

Furthermore, when switch A operates to arm the fuze, movable contact 81 included in the firing circuit 82 moves into engagement with contact element 83 and since switch 71 has been operated, movable contact 74 thereof is in engagement with contact 84, and thus a firing connection is established between the charged condenser C3 and the primer P, a normally open impact switch 85 being also included in the aforesaid firing circuit. The firing circuit is maintained normally open by the impact responsive switch 85. By this arrangement, and in response to impact of the missile with the target, impact switch 85 is actuated to a closed position. When this occurs, condenser C3 discharges through primer P and fires the primer thereby to initiate explosion of the main charge disposed within the missile.

It will be understood, however, that an important safety feature is provided by the delay action of the explosive arming device D for the reason that it prevents premature detonation of the main charge by the primer. The explosive arming switch A and the explosive arming device D are connected in parallel, whereupon the aforesaid devices receive their firing impulses simultaneously. When this occurs switch A operates instantly in response to this impulse, however, the operation of device D which moves the primer shutter 79 and alines the primer P with the main charge E is delayed, the delay period being controlled by the period of time required for the primer shutter to move the primer into firing engagement with the main charge and the period of time required for complete combustion of the pyrotechnic delay element arranged in device D after ignition thereof.

In the event that the rocket fails to take off, the charging switch R1 which is operated for a short period of time such, for example, as one tenth of a second during the charging cycle releases and grounds the leads to the condensers C1 and C3 thereby discharging and preventing further charging thereof and thus rendering the missile a dud.

Another important feature of the aforesaid arming circuit is the provision of a circuit arrangement whereby the arming time and the delay time settings can be varied from 1 second to 5 seconds up to the time the round is released from the launching rack. Furthermore, by selecting and matching the fuze components, a high degree of accuracy and a longer arming time may be obtained such, for example, as 20 seconds. By such an arrangement it is possible with the present invention to use electric time fuzes in rockets or to control an auxiliary rocket motor thereby to give the rocket additional striking power.

Furthermore, an arrangement is provided whereby the fuze cannot be completely armed until after the rocket has been propelled from the launching apparatus, this feature being accomplished by the circuit arrangement disclosed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. In a rocket launching apparatus including a pair of mutually spaced members for supporting a rocket in a loaded position therein, a conductor mounted on said members and insulated therefrom, said rocket containing an explosive and a rocket propellant for propelling the rocket along said members as the propellant is fired, igniter means in said rocket responsive to an electrical impulse received thereby from an external source of electrical energy for firing said propellant, a first contact element supported by said rocket at the forward end portion thereof, an igniter circuit including said contact element and said conductor for applying said impulse to the igniter means when the rocket is in said loaded position, an arming circuit including the contact element and rendered operative when said contact element is in engagement with the conductor and as the rocket is propelled along said members, switch means included within said arming circuit for maintaining said arming circuit in an open condition until the acceleration of the rocket has decreased to a predetermined value and the rocket has been propelled from the members, a second contact element supported by said rocket at the rear end portion thereof, a firing circuit in said rocket, switch means included within said firing circuit for rendering said firing circuit operative as the second contact element moves into engagement with said conductor as the rocket is propelled along said members, an inertial device arranged within said firing circuit and actuated from an initial position to a firing position in response to a sudden shock received thereby, and a primer operatively connected to said inertial device and included within said firing circuit and fired as said inertial device is actuated to said firing position thereby to explode the rocket upon impact thereof with a target.

2. A rocket launching apparatus comprising, in combination, a launching rack, a rocket supported on said rack in a loaded position and containing an explosive charge and a rocket propellant for propelling the rocket along said rack as the propellant is fired, an igniter circuit, an igniter included within said igniter circuit and fired in response to an impulse received thereby from an external source of electrical energy for firing said propellant when the rocket is in said loaded position, a charging circuit including a pair of condensers charged with electrical energy from said source as the rocket is propelled along said rack, arming means including a switch and a delay device adapted to be operated in response to said energy from said condensers being discharged therethrough for arming said rocket when a predetermined period of time has elapsed, a movable primer operatively connected to said delay device and moved into firing engagement with said explosive charge as the rocket is armed by said arming means, a firing circuit, a storage device for electrical energy included within said firing circuit and charged by said source of electrical energy concurrently with the charging of said pair of condensers, operation of said switch serving to operatively interconnect the primer with the firing circuit, and an impact responsive device for causing the energy in the storage device to be discharged through said primer as said impact responsive device is actuated from an initial position to a closed position in response to impact of the rocket with a target thereby to fire said primer and explode said charge.

3. A rocket launching apparatus comprising, in combination, a launching rack, a rocket supported on said rack for movement along said rack as the rocket is set in motion, said rocket having propellant means arranged therein and adapted to be fired for setting said rocket in motion along its trajectory an ignition circuit including an igniter fired in response to an electrical impulse received thereby from an external source of electrical energy for firing said propellant means, means including a pair of normally charged condensers for arming the rocket as said condensers are discharged, a normally open switch device operated to a closed position in response to an electrical impulse received thereby from an external source of electrical energy when the rocket has moved a predetermined amount along said rack for providing a discharge path for said condensers, a firing circuit, a primer in said firing circuit, a normally charged storage device included in said firing circuit and adapted to be discharged through said primer in response to impact of the rocket with a target, and means responsive to said impact and included in said firing circuit for causing discharge of said storage device through said primer thereby to fire the primer.

4. A rocket launching apparatus comprising, in combination, a launching rack, a rocket supported on said rack for movement along said rack as the rocket is set in motion, said rocket having propellant means arranged therein and adapted to be fired for setting the rocket in motion along its trajectory an ignition circuit including an igniter fired in response to an electrical impulse received thereby from an external source of electrical energy for firing said propellant means, an arming circuit for the rocket, a pair of normally charged condensers included within said arming circuit, an arming switch including a delay device arranged within said arming circuit and operated as said condensers are discharged therethrough for delaying the arming of said rocket until a predetermined period of time has elapsed, a switch device operated in response to an electrical impulse received from said source when the rocket has moved a predetermined amount along said rack for providing a discharge path for said condensers, a firing circuit, a primer in said firing circuit in the rocket, a normally charged storage device included in said firing circuit and adapted to be discharged through said primer in response to impact of the rocket with a target, and means responsive to said impact for causing discharge of said storage device through said primer thereby to fire the primer.

5. In combination, an aircraft wing, a pair of rails secured to said wing on the under side thereof in spaced relation with respect to each other for supporting a rocket and its motor in a loaded position thereon, a fuze in said rocket, a pair of elongated conductors mounted on said rails respectively and insulated therefrom, a pair of carriages on said rocket in engagement with said rails for supporting the rocket in said loaded position, means including a contact member on one of said carriages in engagement with one of said elongated conductors for initiating said rocket motor in response to an electrical impulse received thereby when the rocket is in said loaded position, and means including a contact element on the other carriage and normally spaced from said rails for arming said fuze when the rocket has been propelled a predetermined amount along said rails by said motor and said contact element moves into engagement with said one conductor.

6. In combination, a rocket launching rack including a pair of spaced apart rails, a pair of elongated conductors mounted on said rails respectively and insulated therefrom, a rocket having a pair of carriages secured thereto, said carriages being carried by said rails for supporting the rocket in a loaded position and for movement of the rocket therealong, an arming circuit in the rocket, said arming circuit including a condenser, a firing circuit in the rocket, said firing circuit including a storage device for electrical energy, a pair of contact elements carried by one of said carriages and engaging said conductors respectively, a circuit for charging said condenser including one of said conductors and the respective contact element in engagement therewith, a circuit for charging said storage device including the other of said conductors and the other contact element, an additional contact element carried by the other of said carriages and normally spaced from said conductors, and means including said additional contact element and one of said conductors for disconnecting said condenser and storage device from the charging circuits thereof when the rocket has moved a predetermined distance along said rails and said last-named contact element moves into engagement with said last-named conductor.

References Cited in the file of this patent

UNITED STATES PATENTS

| 1,739,921 | Schuler et al. | Dec. 17, 1929 |
| 1,841,983 | Ruhlemann | Jan. 19, 1932 |
| 1,897,863 | Ruhlemann | Feb. 14, 1933 |
| 1,917,813 | Ruhlemann | July 11, 1933 |
| 2,422,660 | Elder et al. | June 24, 1947 |
| 2,428,761 | Richards | Oct. 7, 1947 |
| 2,766,662 | Marcus et al. | Oct. 16, 1956 |

FOREIGN PATENTS

| 22,173 | France | May 14, 1921 |
| | (Addition to 493,296) | |
| 832,464 | France | Sept. 28, 1938 |
| 624,582 | Great Britain | June 13, 1949 |